(12) United States Patent
Furmanczyk

(10) Patent No.: US 7,796,413 B2
(45) Date of Patent: Sep. 14, 2010

(54) AC TO DC POWER CONVERTER FOR AEROSPACE APPLICATIONS

(75) Inventor: Kaz Furmanczyk, Marysville, WA (US)

(73) Assignee: ELDEC Corporation, Lynnwood, WA (US)

( * ) Notice: Subject to any disclaimer, the term of this patent is extended or adjusted under 35 U.S.C. 154(b) by 134 days.

(21) Appl. No.: 12/018,104

(22) Filed: Jan. 22, 2008

(65) Prior Publication Data

US 2008/0278967 A1    Nov. 13, 2008

Related U.S. Application Data

(60) Provisional application No. 60/881,897, filed on Jan. 22, 2007.

(51) Int. Cl.
*H02M 5/02* (2006.01)
*H02M 7/06* (2006.01)

(52) U.S. Cl. .................. 363/155; 363/126; 363/149

(58) Field of Classification Search .............. 363/5, 363/64, 125, 148, 149, 153, 154, 155, 156, 363/126
See application file for complete search history.

(56) References Cited

U.S. PATENT DOCUMENTS

| | | | |
|---|---|---|---|
| 4,779,181 A * | 10/1988 | Traver et al. | ................ 363/154 |
| 4,876,634 A | 10/1989 | Paice | |
| 5,124,904 A | 6/1992 | Paice | |
| 5,455,759 A | 10/1995 | Paice | |
| 5,619,407 A | 4/1997 | Hammond | |
| 6,101,113 A | 8/2000 | Paice | |
| 6,191,968 B1 | 2/2001 | Paice | |
| 6,335,872 B1 | 1/2002 | Zhou | |
| 6,525,951 B1 | 2/2003 | Paice | |
| 6,650,557 B2 | 11/2003 | Ferens | |
| 7,274,280 B1 * | 9/2007 | Paice | .......................... 336/148 |

OTHER PUBLICATIONS

Furmanczyk, F., and M. Stefanich, "Demonstration of Very High Power Airborne AC to DC Converter," Paper No. 2004-01-3210, Power Systems Conference, Reno, Nevada, Nov. 2004, 12 pages.
Furmanczyk, F., and M. Stefanich, "Overview of Multiphase Power Converters for Aerospace Applications," Paper No. 2008-01-2878, Power Systems Conference, Seattle, Nov. 2008, 13 pages.
Furmanczyk, F., and M. Stefanich, "Power Conversion Technologies for Reducing Harmonics on the More Electric Aircraft," Paper No. 06PSC-27, Power Systems Conference, New Orleans, Nov. 2006, 11 pages.

* cited by examiner

*Primary Examiner*—Gary L Laxton
(74) *Attorney, Agent, or Firm*—Christensen O'Connor Johnson Kindness PLLC

(57) ABSTRACT

Three coils, each having several serial windings, have selected windings connected in a delta. Input AC power is applied through outrigger windings at the delta apices. At least two strategically located, direct tap, natural output points are provided at each side of the delta. For 6-phase output, only the six natural output points are required. For 9-phase output, an additional central output terminal connects to each side of the delta through a stub winding. The 6-phase or 9-phase output is passed to a rectifier circuit.

8 Claims, 11 Drawing Sheets

US 7,796,413 B2

AC TO DC POWER CONVERTER FOR AEROSPACE APPLICATIONS

CROSS-REFERENCE TO RELATED APPLICATION

This application claims the benefit of Provisional Application No. 60/881,897, filed Jan. 22, 2007, which is expressly incorporated by reference herein.

BACKGROUND

Derek A. Paice in his U.S. Pat. No. 5,124,904, expressly incorporated by reference herein, was concerned with AC to DC converters, such as can be used for AC or DC motors. Paice recognized one problem with static AC to DC converters, namely, the generation of harmonics on the AC lines, which are caused by the rectification process. Paice's object was to design an 18-pulse converter system with "optimized" structural and functional characteristics. The Paice invention used three 6-pulse rectifier bridges directly connected in parallel with the DC terminals, two of the bridges operating under respective +40° and −40° phase shift relative to the AC lines, the third (central) bridge being directly connected to the AC lines, and the rectifiers being controlled for 40-degree current condition.

Peter W. Hammond in his U.S. Pat. No. 5,619,407, expressly incorporated by reference herein, was concerned with autotransformers for converting 3-phase power to 9-phase power, and particularly to autotransformers for providing reduced harmonics and ripple in an AC to DC rectifier. Hammond recognized an advantage of the Paice system, referred to above, of an autotransformer passing the three input phases directly through to become three of the output phases of the autotransformer, the autotransformer generating six additional output phases to achieve a total of nine output phases. Hammond states that when the Paice system feeds an 18 pulse rectifier, the DC output voltage is about 14% higher than would result from the original 3-phase AC input power feeding a 6-pulse rectifier. Hammond, therefore, deemed it desirable to reduce the magnitude of the 9-phase AC voltage to compensate for this 14% increase in DC voltage. According to Hammond, the magnitude of voltage should be reduced for use with an existing system that previously utilized 6-pulse rectifiers so that the DC voltage remains unchanged. The Hammond invention involved an autotransformer including three coils each having a plurality of serial windings and a plurality of stub windings. The serial windings form a delta and the stub windings are magnetically coupled with serial windings from the same coil. The stub windings are additionally electrically connected at a first end thereof with respective ones of the serial windings. Three terminals are provided at the apices of the delta.

Both the Paice patent and the Hammond patent discuss earlier approaches for AC to DC power converters.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The preferred embodiments of the present invention provide AC to DC power converters for modern aerospace applications that use a primary AC system operating at 230 volts AC. The system of the invention allows conversion from 230 volt AC to 270 volts DC while preserving most of the advantages of an ATRU. In general, three coils, each formed of several serial windings, form a delta. In one specifically described system, six output points between serial windings are located for 6-phase output. All six phases require no additional phase shift, using natural points between delta serial windings, two such points on each of the three sides. In another specifically described system, nine output points between serial windings are located for a high quality, 9-phase output. Six of the nine phases require no additional phase shift, using natural points between delta serial windings. Three phases, one on each side of the delta, need only very short correction (stub) windings. For final voltage tuning, an outrigger winding may be added at each apex (leading to the AC input).

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the field of avionics, there is an increasing number of DC-powered components, including flight critical and emergency equipment, with seemingly constantly increasing power requirements. As power needs increase, voltage or current, or both, must be increased. Increased current can be the least desirable because it leads to larger, heavier wiring and other electrical components. Nevertheless, over time, standards have evolved including equipment (actuators, pumps, and so on) that are designed for 270 volt DC input power, which is obtained by direct rectification of 115 volt AC power. In general, the Paice and Hammond topologies, referred to above, provide reasonable power quality for a 115-volt AC to 270 volt DC conversion.

Some modern aircraft, however, are designed for a primary AC system operating at 230 volts AC. Existing ATRU approaches quickly lose their size/weight advantage when input/output voltages are not compatible in magnitude. For example, for an 18 pulse ATRU, with 230 volt AC in and 270 volt DC out, the autotransformer size reaches or almost reaches the size of a regular transformer approach.

Figure 1:
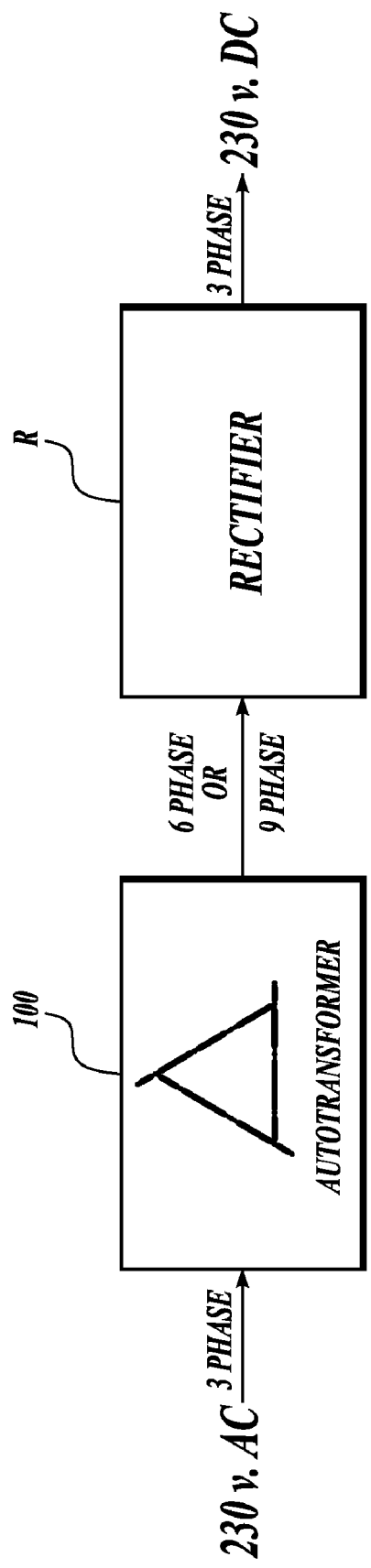
FIG. 1 is a block diagram of an AC to DC power converter in accordance with the present invention.

FIG. 1 represents an application for a preferred embodiment of the present invention. At the input side, 3-phase 230 volt AC power is supplied to an autotransformer 100 in accordance with the present invention. In the representative implementations described in detail below, the autotransformer converts the power to 6-phase or 9-phase AC, which is supplied to the rectifier circuit R. The rectifier circuit can be of a type well-known in the art, such as is shown in the Hammond patent, and is therefore not further described herein. Due to the features of the novel autotransformer 100, the rectifier circuit outputs high-quality 270 volt DC compatible with aerospace components.

Figure 2:
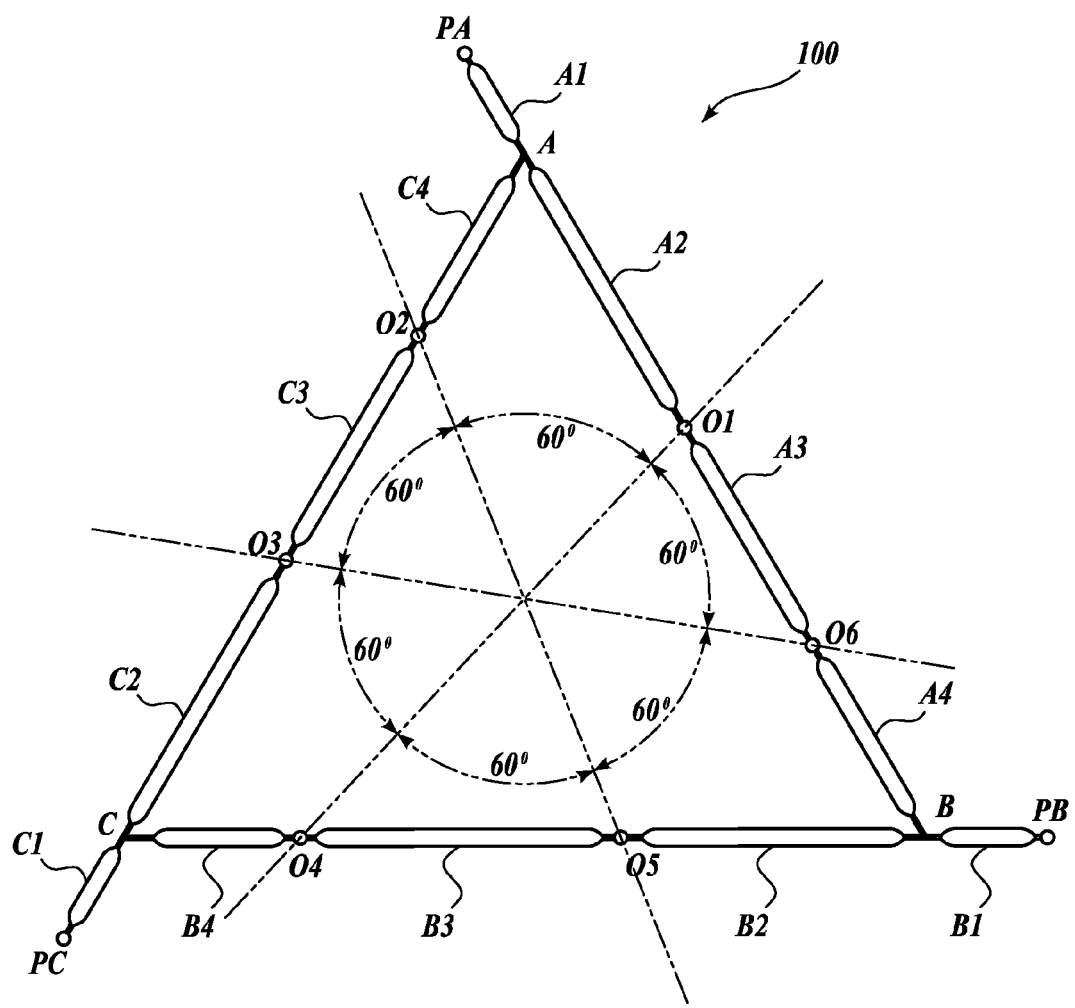
FIG. 2 is a very diagrammatic illustration of the topology of a first embodiment of an AC to DC power converter for aerospace applications in accordance with the present invention.

In some applications, avionics power quality requirements can be met by a 12-pulse output. FIG. 2 shows the topology of an autotransformer 100 in accordance with the present invention, for providing the 12-pulse (6-phase) output. The delta configuration includes three input points PA, PB, and PC, for the 230 volt AC three-phase input. The corresponding delta apices are points A, B, and C. An outrigger winding is provided between each of the inputs and the corresponding apex, i.e., one outrigger winding A1 between PA and A, one outrigger winding B1 between PB and B, and one outrigger winding C1 between PC and C. Each side of the delta has three serial windings. Moving clockwise from apex A, windings A2, A3, and A4 are interposed between A and B; windings B2, B3, and B4 between B and C; and windings C2, C3, and C4 between C and A. The output points or taps 01, 02, 03, 04, 05, and 06 are natural points between adjacent serial windings. More specifically, no stub windings are required for this 12-pulse implementation of the present invention making the approach very simple and cost effective. Voltage reduction and phase shifting are obtained from the strategically located natural output points. The 6-phase output has voltages spaced 60°, and no additional phase shifting is required.

Figure 2A:
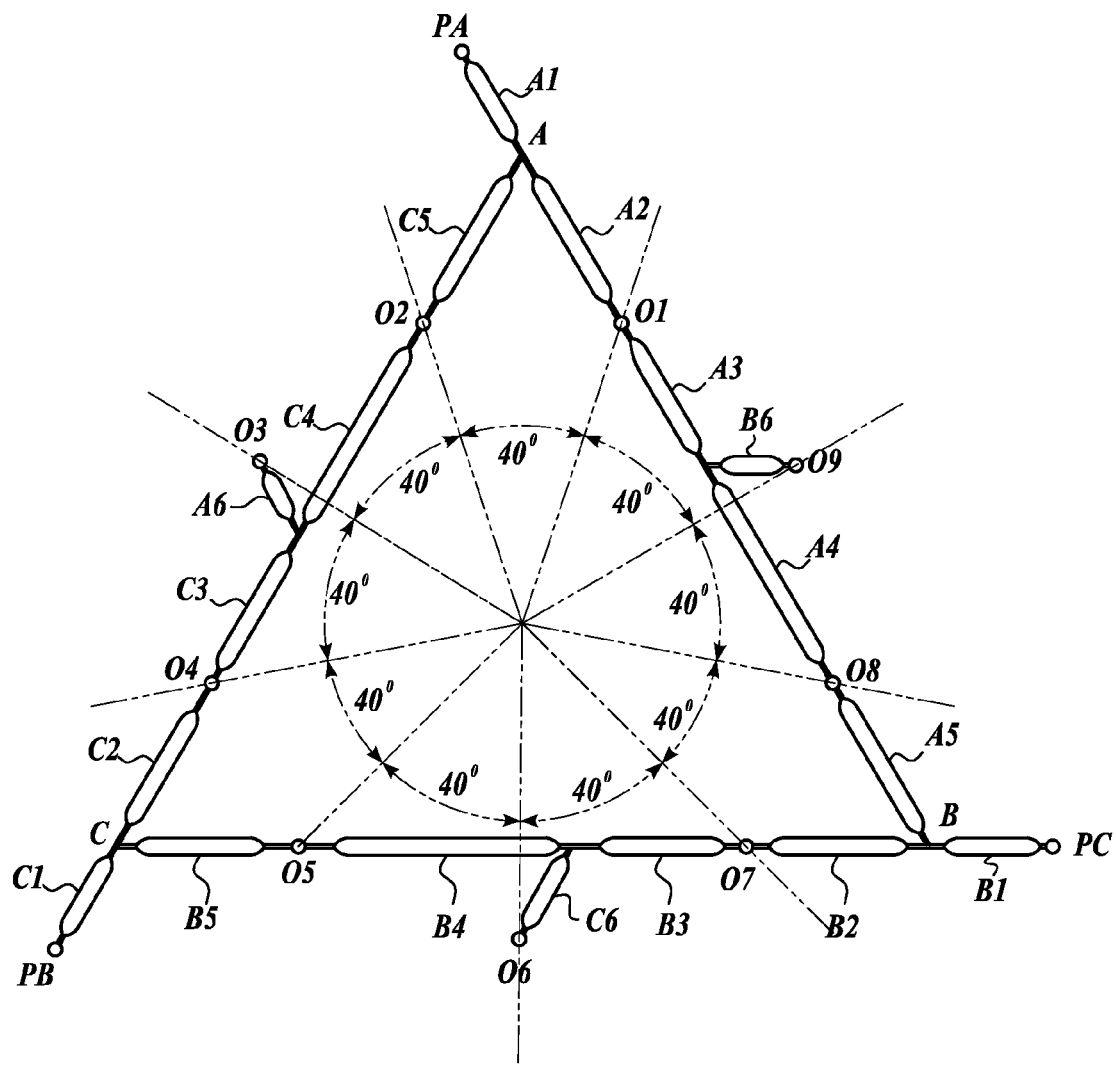
FIG. 2A is a very diagrammatic illustration of the topology of a second embodiment of an AC to DC power converter for aerospace applications in accordance with the present invention.

For some applications, avionics power quality requirements need rectification techniques of at least 18-pulse, such as for high powered units (5 kW and above). The topology of such an 18-pulse system in accordance with the present invention is shown in FIG. 2A. Similar to the previously described embodiment, 230 volt AC input is provided at points PA, PB, and PC. The delta apices are points A, B, and C, and an outrigger winding (A1, B1, C1) is provided at each apex for final voltage tuning. Each side of the delta has four serial windings. Between A and B, the windings are designated A2, A3, A4, and A5; between B and C, the windings are designated B2, B3, B4, and B5; and between C and A, the windings are designated C2, C3, C4, and C5. At each side there are three output points, two of which are strategically located natural points. The natural output points are located adjacent to each apex, that is, there is one serial winding between each natural point and the closest apex. Thus, the natural points are between the "2" and "3" winding and the "4" and "5" winding at each side, such as between A2 and A3 and between A4 and A5 on the A coil side. Each side of the delta also has a third, central output point between the serial windings of that side nearest the center (the "3" and "4" windings), and those three phases require only very short correction or stub windings A6, B6, and C6.

Figure 3:
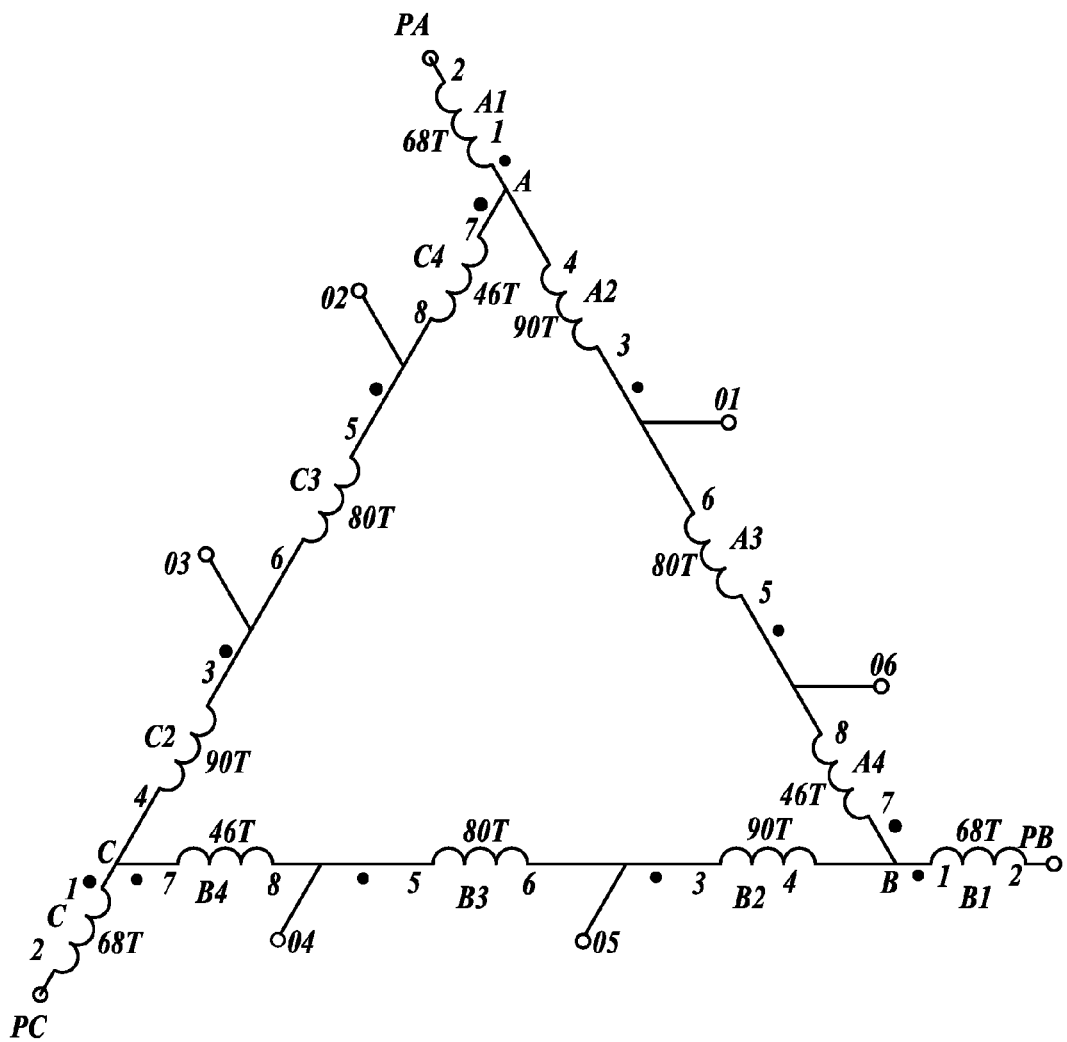
FIG. 3 is a schematic diagram of the first embodiment of the invention.
Figure 4:
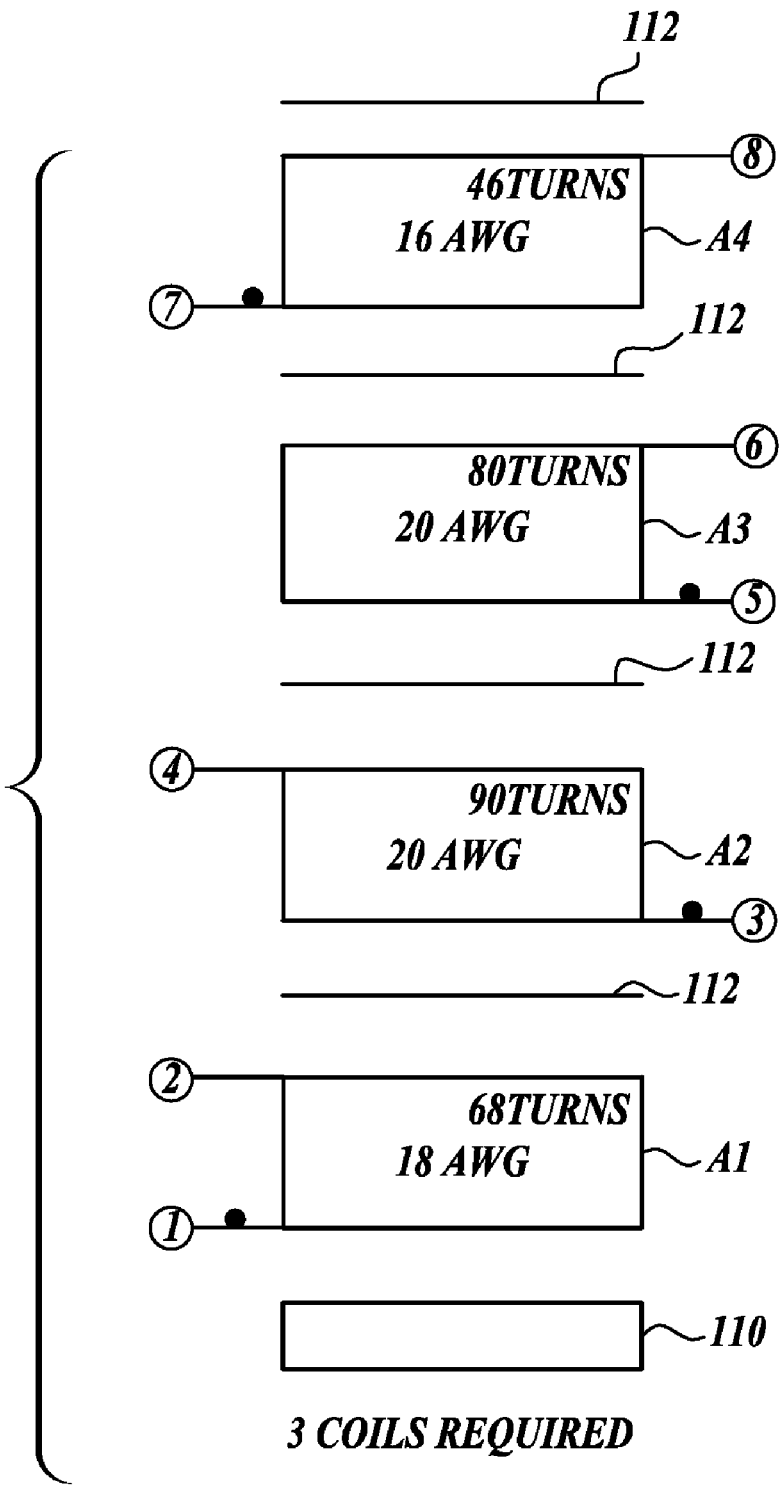
FIG. 4 is a diagram illustrating the sequence of windings for a representative coil of the first embodiment.
Figure 5:
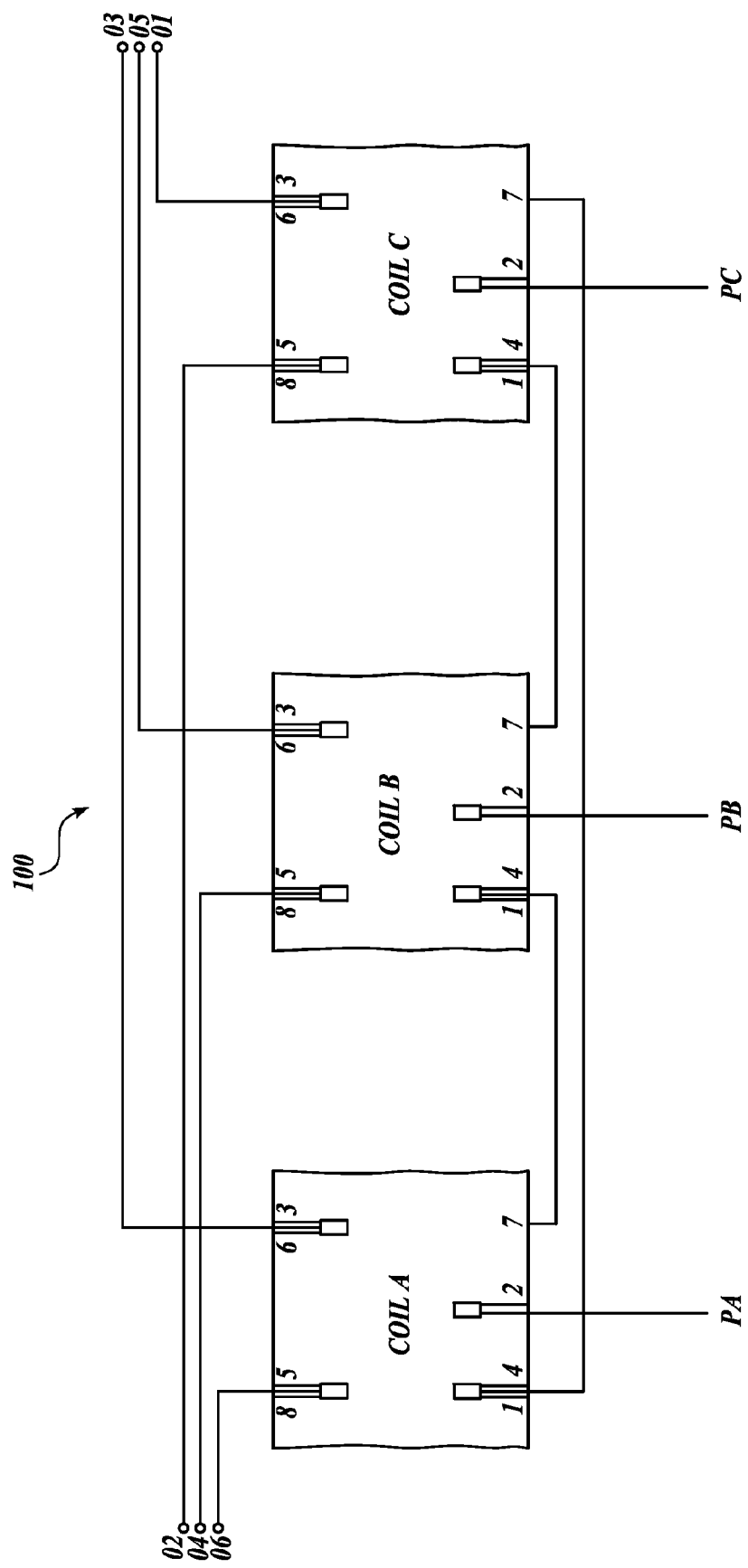
FIG. 5 is a preassembly drawing for the first embodiment.
Figure 6:
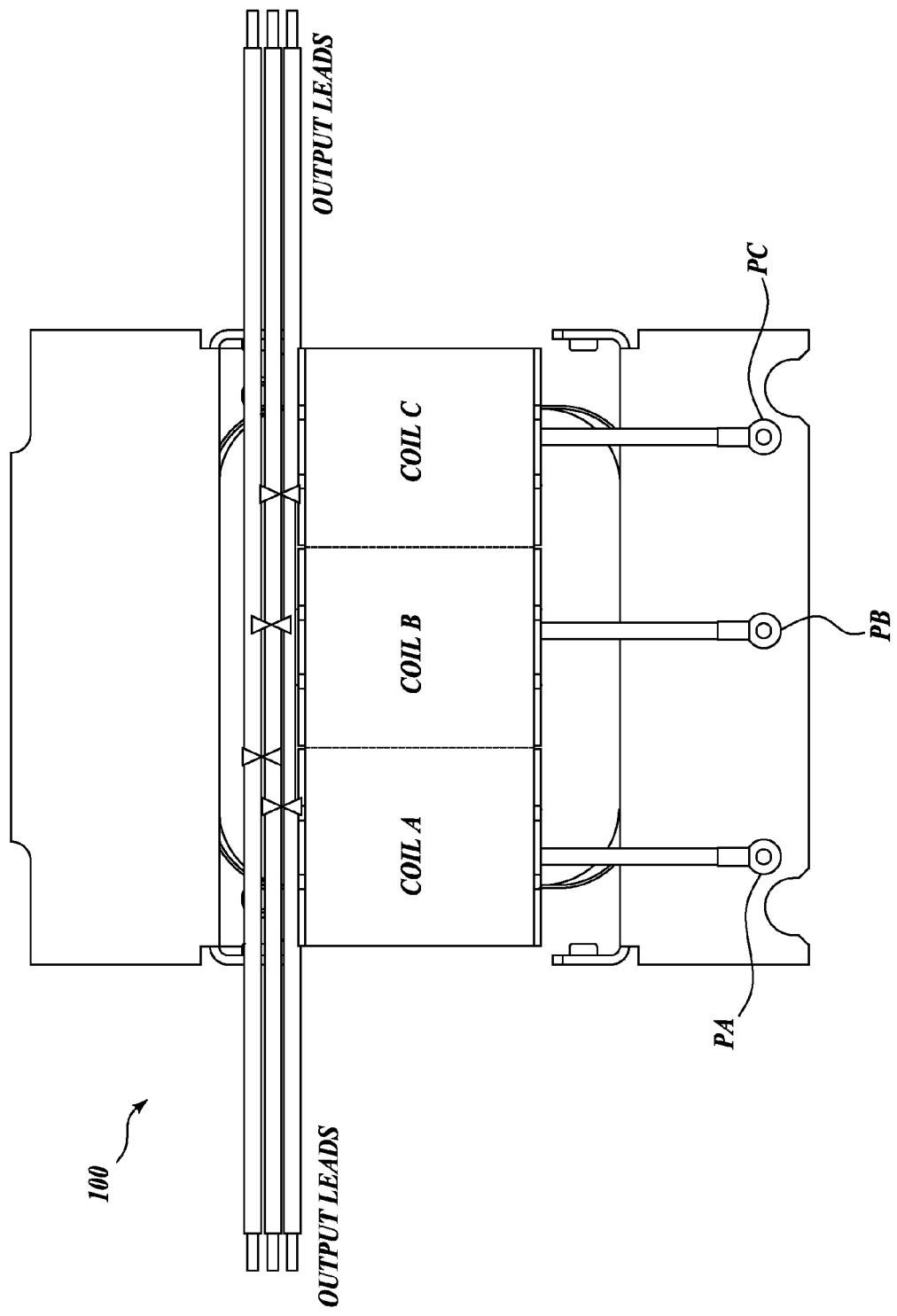
FIG. 6 is a diagram showing the first embodiment in assembled condition.

More detail for a specific implementation of the first embodiment is shown in FIG. 3 (schematic), FIG. 4 (winding diagram), FIG. 5 (preassembly diagram), and FIG. 6 (assembly diagram). FIG. 3 shows the three input points PA, PB, and PC, for the 230 volt AC, 3-phase input; and the six output taps or junctions (01 to 06) for the 6-phase output. The serial windings on each side of the delta are given the same nomenclature as in FIG. 2. The number of turns (T) is given for each winding. For example, the three outrigger windings (A1, B1, C1) are each 68 turns between the points labeled 1 and 2 of coil A, coil B, and coil C. For the other serial windings of coil A, winding A2 has 90 turns between points 4 and 3, A3 has 80 turns between points 6 and 5, and A4 has 46 turns between points 8 and 7. The turns are equal for the corresponding windings on the B and C coils. FIG. 4 shows the winding sequence for each coil. Box 110 at the bottom represents the bobbin and lines 112 represent isolation tape between windings. FIG. 5 shows the preassembly drawing for the three coils. FIG. 6 shows the assembled unit with the coils mounted on a bracket and secured by banding as is known in the art.

As noted above, voltage reduction and phase shifting are obtained from the strategically located natural points 01 to 06. The result is a 6-phase output with the phases 60° apart, without additional stub coils being required. This provides a significant advantage in construction cost, construction complexity, and weight. In aerospace applications, weight is always a concern. The turns ratios are important in order to achieve both voltage reduction and high power quality while minimizing complexity and, particularly, weight. If we normalize the turns ratio along each side (from A to B, B to C, and C to A), the ratios are 0.417:0.370:0.213 for A1:A2:A3, which are the same for the B and C sides. Voltage tuning can be achieved by a turns ratio of 0.315 for each outrigger (as compared to the total number of windings for the other three windings on that side). For the illustrated implementation of the first embodiment, each outrigger winding has 68 turns; A2, B2, and C2 each have 90 turns (from the apex to the first direct tap, natural output point or terminal); A3, B3, and C3 each have 80 turns (center winding on that side between the two direct tap, natural output points or terminals); A4, B4, and C4 have 46 turns (from the second tap point to the next apex of the delta). The numbers and ratios are exactly those used in an implementation of the first embodiment, but they are "approximate" insofar as the invention is concerned. Variation by up to 5% of the given turns ratios values will affect the output power quality but may nevertheless be acceptable for a specific use. The total number of the coil turns may vary with the selected autotransformer core.

Figure 7:
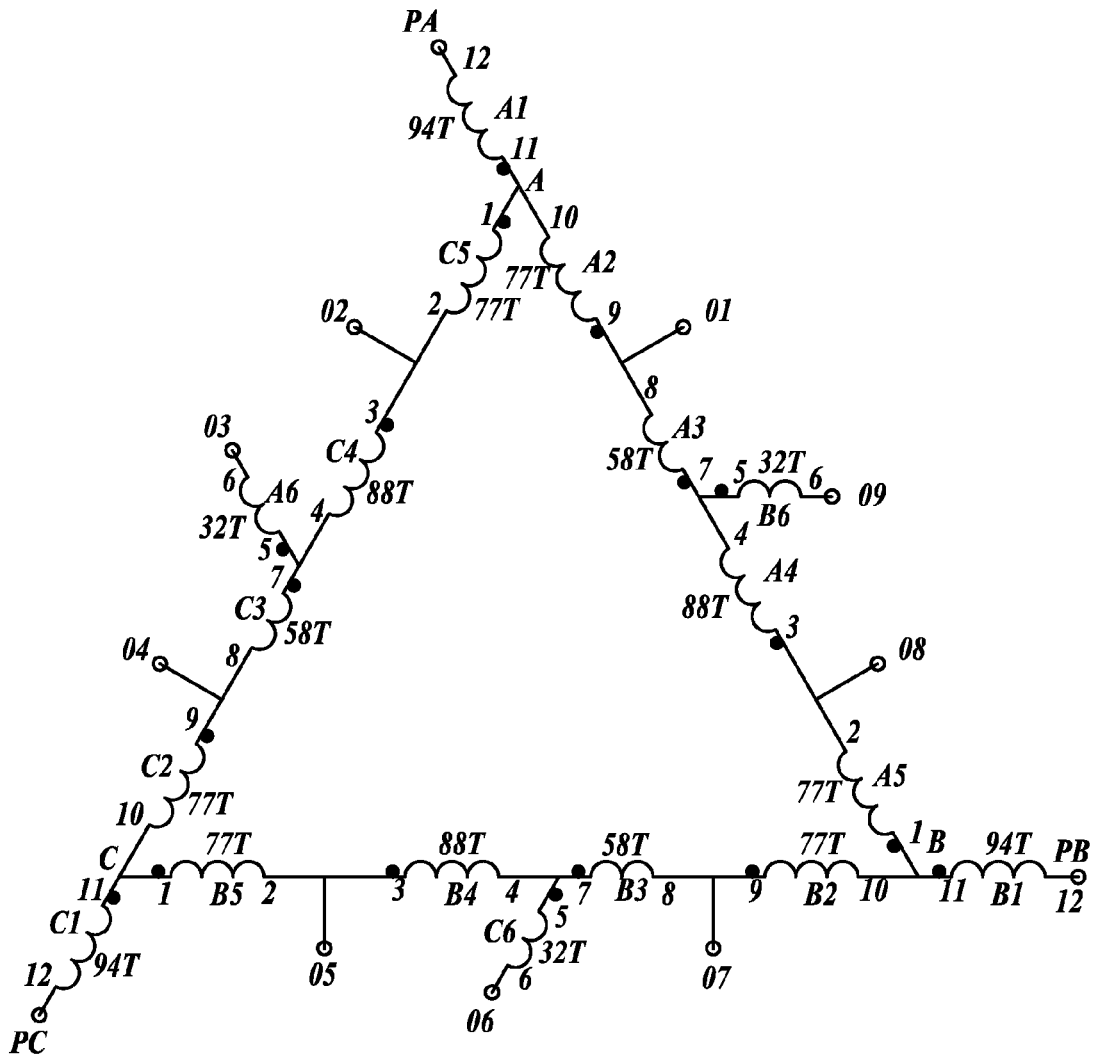
FIG. 7 is a schematic diagram of the second embodiment of the invention.
Figure 8:
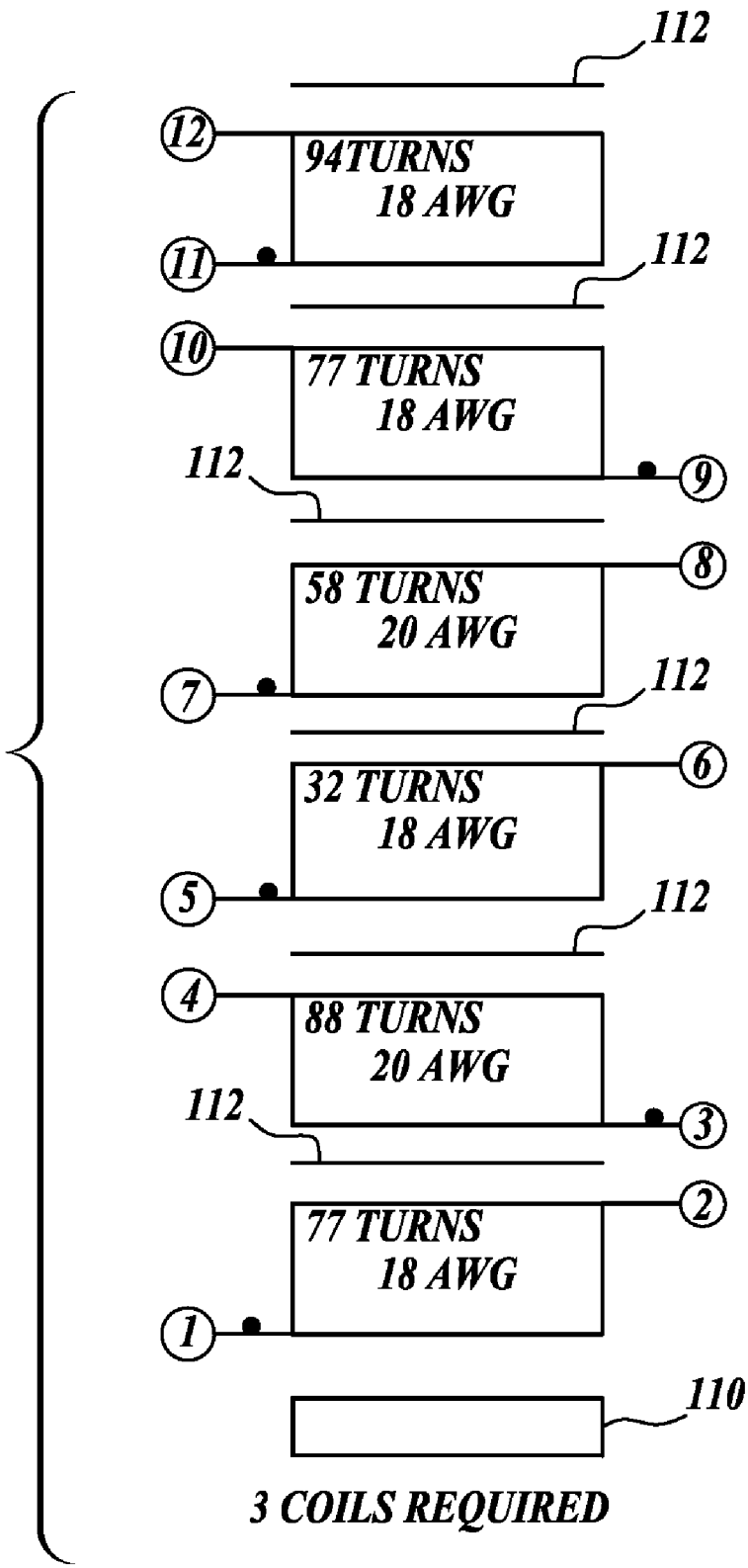
FIG. 8 is a diagram illustrating the sequence of windings for a representative coil of the second embodiment.
Figure 9:
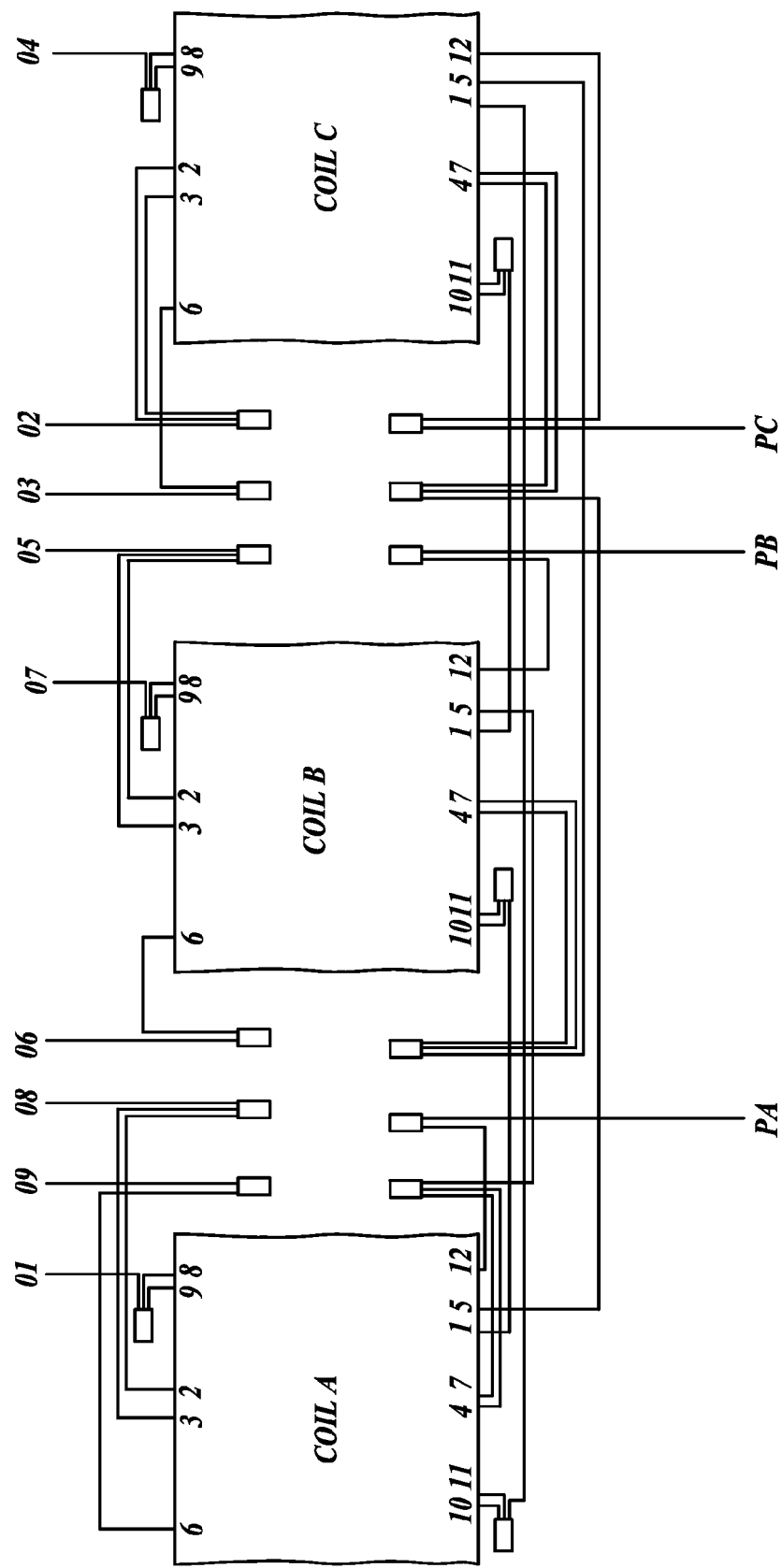
FIG. 9 is a preassembly drawing for the second embodiment.
Figure 10:
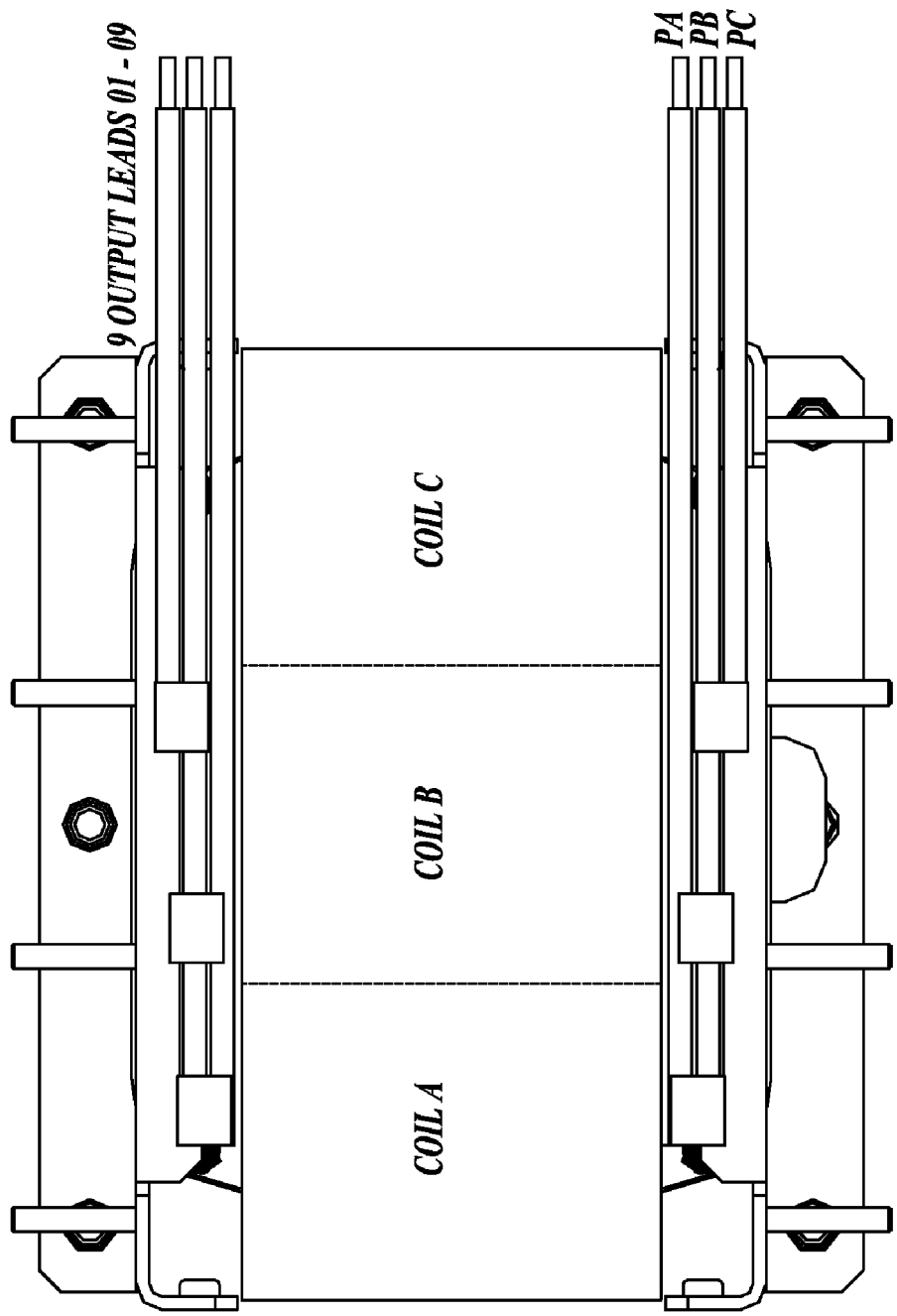
FIG. 10 is a diagram showing the second embodiment in assembled condition.

More detail for a specific implementation of the second embodiment is shown in FIG. 7 (schematic), FIG. 8 (winding diagram), FIG. 9 (preassembly diagram), and FIG. 10 (assembly diagram). FIG. 7 shows the three input points PA, PB, and PC, for the 230 volt AC, 3-phase input; and the nine output taps or junctions (01 to 09) for the 9-phase output. The serial windings on each side of the delta are given the same nomenclature as in FIG. 2, for example A1 to A5 for coil A. The number of turns (T) is given for each winding. For example, the three outrigger windings (A1, B1, C1) are each 94 turns between the points labeled 11 and 12 of coil A, coil B, and coil C. For the other serial windings of coil A, i.e., the serial windings between apices, winding A2 has 77 turns between points 10 and 9, A3 has 58 turns between points 8 and 7, and A4 has 88 turns between points 4 and 3, and A5 has 77 turns between points 2 and 1. The turns are equal for the corresponding windings on the B and C coils. Also, at each side a stub winding (A6, B6, C6) extends from between points 4 and 7 (also labeled point 5) to an output terminal (09 on the A side, 06 on the B side, 03 on the C side). Each stub winding has 32 turns.

In addition to the stub outputs, voltage reduction and phase shifting are obtained from the six strategically located natural points 01, 02, 04, 05, 07, and 08. Thus, there are two natural, direct tap outputs and one central stub winding output on each side of the delta. The result is a 9-phase output with the phases 40° apart, with only the three small stub windings being required. As for the first embodiment, this provides a significant advantage in construction cost, construction complexity, and weight, as compared to prior 9-phase (18 pulse) designs.

As for the first embodiment, in the second embodiment, the turns ratios are important in order to achieve both voltage reduction and high power quality while minimizing complexity and, particularly, weight. If we normalize the turns ratio along each side (from A to B, B to C, and C to A), the ratios for the serial windings are 0.257:0.193:0.293:0.257 for A2:A3: A4:A5, which are the same for the serial coils of the B and C sides. Each stub winding A6, B6, C6 has a turn ratio of 0.107 (as compared to the total number of turns for the four serial windings on that side of the delta between apices). Voltage tuning can be achieved by a turns ratio of 0.313 for each outrigger. For the illustrated implementation of the second embodiment, each outrigger winding has 94 turns; A2, B2, and C2 each have 77 turns (from the apex to the first direct tap, natural output point or terminal); A3, B3, and C3 each have 58 turns (from the first direct tap, natural output point or terminal to the center tap point for the stub winding); A4, B4, and C4 have 88 turns (from the stub tap point to the second direct tap, natural output point or terminal) and A5, B5, C5 have the same number of turns as A2, B2, C2 (77 turns from the second direct tap natural point or terminal to the next apex of the delta). The numbers and ratios are exactly those used in an implementation of the second embodiment, but as for the first embodiment, they are "approximate" insofar as the invention is concerned. Variation by up to 5% of the given turns ratios values will affect the output power quality but may nevertheless be acceptable for a specific use. The total number of the coil turns may vary with the selected autotransformer core.

FIG. 8 shows the wiring sequence diagram for each coil of the second embodiment. The box 110 at the bottom represents the bobbin and the lines 112 between the windings represents isolation tape. FIG. 9 is the preassembly diagram with the input and output connections, and FIG. 10 shows the assembled unit with the A, B, and C coils attached to a bracket and secured by banding as is known in the art.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An autotransformer for converting three-phase AC power to at least six phase AC power comprising:

three coils, each of said coils having at least four serial windings including an outrigger winding and three serial side windings, said coils having their serial windings arranged in a delta with one of said outrigger windings extending from an apex of the delta, whereby each side of the delta has at least three serial windings and each apex of the delta has one of the outrigger windings extending therefrom;

each of the outrigger coils having an end terminal remote from the adjacent apex from which such outrigger coil connects for connection of said terminals to a three-phase AC input; and at least two direct outputs along each side of the delta, each direct output being a direct tap at a natural point between adjacent side windings with no additional phase correction or stub windings for said direct outputs, whereby at least six equiangularly spaced phases are presented at said direct outputs.

2. An AC to DC power converter for converting 3-phase 230 volt AC input power to 6-phase 270 volt DC output power comprising:

three coils, each of said coils having four serial windings (A1, A2, A3, A4; B1, B2, B3, B4; C1, C2, C3, C4) including an outrigger winding (A1; B1; C1) and three serial side windings (A2, A3, A4; B2, B3, B4; C2, C3, C4), said coils having their serial windings arranged in a delta with one of said outrigger windings extending from an apex of the delta, whereby each side of the delta has three serial windings (A2, A3, A4; B2, B3, B4; C2, C3, C4) and each apex of the delta has one of the outrigger windings (A1; B1; C1) extending therefrom;

each of the outrigger coils having an end terminal (PA; PB; PC) remote from the adjacent apex from which such outrigger coil connects for connection of said terminals to a 3-phase 230 volt input;

two direct outputs (02, 03; 04, 05; 06, 01) along each side of the delta, each direct output being a direct tap at a natural point between adjacent side windings with no additional phase correction or stub windings for said direct outputs, whereby six equiangularly spaced phases are presented at said direct outputs; and a rectifier circuit (R) receiving said six phases for conversion to a 270 volt DC output.

3. The converter of claim 2, in which the three serial windings of each side of the delta have turns ratios of approximately 0.417:0.370:0.213, as compared to the total number of turns forming a side of the delta.

4. The converter of claim 3, in which each outrigger winding has a turns ratio of approximately 0.315, as compared to the number of turns of the three serial windings forming a side of the delta.

5. An AC to DC power converter for converting 3-phase 230volt AC input power to 9-phase 270 volt DC output power comprising:

three coils, each of said coils having five serial windings (A1, A2, A3, A4, A5; B1, B2, B3, B4, B5; C1, C2, C3, C4, C5) including an outrigger winding (A1; B1; C1) and four serial side windings (A2, A3, A4, A5; B2, B3, B4, B5; C2, C3, C4, C5), said coils having their serial windings arranged in a delta with one of said outrigger windings extending from an apex of the delta, whereby each side of the delta has four serial windings (A2, A3, A4, A5; B2, B3, B4, B5; C2, C3, C4, C5) and each apex of the delta has one of the outrigger windings (A1; B1; C1) extending therefrom;

each of the outrigger coils having an end terminal (PA; PB; PC) remote from the adjacent apex from which such outrigger coil connects for connection of said terminals to a 3-phase 230 volt input;

two direct outputs (02, 04; 05, 07; 08, 01) along each side of the delta, each direct output being a direct tap at a natural point between adjacent side windings, and one additional output (03, 06, 09) connected to the central portion of each side of the delta through a stub winding (A6, B6, C6), whereby nine equiangularly spaced phases are presented at said outputs; and a rectifier circuit (R) receiving said nine phases for conversion to a 270 volt DC output.

6. The converter of claim 5, in which the four serial windings of each side of the delta have turns ratios of approximately 0.257:0.193:0.293:0.257, as compared to the total number of turns forming a side of the delta.

7. The converter of claim 6, in which each outrigger winding has a turns ratio of approximately 0.313, as compared to the number of turns of the four serial windings forming a side of the delta.

8. The converter of claim 7, in which each stub winding has a ratio of approximately 0.107, as compared to the total number of turns forming a side of the delta.

\* \* \* \* \*